United States Patent [19]

Stephens

[11] Patent Number: 5,109,042
[45] Date of Patent: Apr. 28, 1992

[54] FLUID LOSS ADDITIVE FOR CEMENT SLURRIES CONTAINING A N-VINYL-2-PYRROLIDONE-$\omega$-2-ACRYLAMIDO-2-METHYLPROPANE SULFONATE-$\omega$-ACRYLIC ACID-$\omega$-ACRYLAMIDE POLYMER

[75] Inventor: Michael Stephens, Bartlesville, Okla.

[73] Assignee: Phillips Petroleum Company, Bartlesville, Okla.

[21] Appl. No.: 462,315

[22] Filed: Dec. 22, 1989

Related U.S. Application Data

[63] Continuation of Ser. No. 29,029, Mar. 23, 1987, abandoned.

[51] Int. Cl.$^5$ .................... C08K 5/42; C08F 226/10
[52] U.S. Cl. .................... 524/166; 524/375; 524/376; 524/377; 524/394; 524/547
[58] Field of Search ............... 524/158, 166, 396, 394, 524/375, 376, 377

[56] References Cited

U.S. PATENT DOCUMENTS

| | | |
|---|---|---|
| 2,614,998 | 10/1952 | Lea . |
| 2,924,277 | 2/1960 | Shell et al. ............... 166/33 |
| 3,132,693 | 5/1964 | Weisend ............... 166/33 |
| 3,409,080 | 11/1968 | Harrison ............... 166/31 |
| 3,994,852 | 11/1976 | Adams et al. . |
| 4,105,991 | 4/1977 | Persinski et al. ............... 106/90 |
| 4,455,169 | 6/1984 | Chatterji et al. ............... 106/93 |
| 4,537,918 | 8/1985 | Parcevaux ............... 523/130 |
| 4,568,471 | 2/1986 | Defosse ............... 252/8.554 |
| 4,587,283 | 5/1986 | Hille ............... 524/3 |
| 4,602,685 | 7/1986 | McKenzie et al. ............... 166/293 |

*Primary Examiner*—Christopher Henderson
*Attorney, Agent, or Firm*—Archie L. Robbins

[57] ABSTRACT

An additive for reducing water loss from cement comprising a tetrapolymer, base, an electrolyte, at least one surfactant, and water is disclosed. A process for producing cement slurries with improved water loss properties, as well as an improved method for cementing gas and oil wells is also disclosed.

3 Claims, No Drawings

FLUID LOSS ADDITIVE FOR CEMENT SLURRIES CONTAINING A N-VINYL-2-PYRROLIDONE-ω-2-ACRYLAMIDO-2-METHYLPROPANE SULFONATE-ω-ACRYLIC ACID-ω-ACRYLAMIDE POLYMER

This application is a continuation of application Ser. No. 029,029, filed Mar. 23, 1987, now abandoned.

The present invention pertains to cement slurry additives which are useful for preventing water loss from cement slurries. Another aspect of the invention relates to a method for preventing water loss from cement slurries. Another aspect of the invention relates to cement slurries which have improved water loss properties. A still further aspect of the invention relates to an improved process for cementing oil and gas wells.

Cement compositions are used in the oil and gas industry to cement the annular space in the well bore between the surrounding formation and the pipe or casing. Typically, the cement slurry is pumped down inside of the casing and back up the outside of the casing through the annular space. The amount of water which is used in forming the cement slurry will vary depending upon the type of hydraulic cement selected and the job conditions at hand. The amount of water used can vary over a wide range, depending upon such factors as the required consistency of the slurry and upon the strength requirement for the particular job.

Many times the hydraulic cement must be placed within or next to a porous medium. For example, earthen strata in the well bore. When this happens, water tends to filter out of the slurry and into the strata during the settling of the cement. Many difficulties are related to an uncontrolled fluid loss of this type such as uncontrolled setting rate, improper placement of the slurry, impaired strength properties, and contamination of the surrounding strata. These conditions are all undesirable in oil and gas well cementing operations.

In order to lessen the loss of fluid from the aqueous cement slurry, various materials have been employed in the past. Unfortunately, these materials often have adverse effects upon the cement itself.

For example, U.S. Pat. No. 4,015,991 teaches the use of a copolymer of acrylamide and 2-acrylamido-2-methylpropane sulfonic acid as a fluid loss additive for cement slurries. Although this copolymer will reduce the fluid loss from cement slurries, it also has the undesirable effect of reducing the compressive strength of the cement and of retarding the rate at which the cement forms a solid.

A further problem with the fluid loss additives currently available, is their ineffectiveness at a temperature in the range of 300° F. to 450° F. For example, the copolymer described in U.S. Pat. No. 4,015,991 is ineffective at a temperature in excess of 250° F.

Thus, it would be a valuable contribution to the art to develop additives which would reduce water loss from cement slurries without having adverse effects upon the compressive strength of the cement or the rate at which the cement solidifies.

It would also be a valuable contribution to the art to develop additives which would reduce the water loss from cement slurries at elevated temperatures.

It is an object of the present invention to provide additives which will reduce the water loss from cement slurries without reducing the compressive strength of the cement or delaying the rate at which the cement solidifies. It is a further object of the present invention to provide additives that will prevent the loss of water from cement slurries at elevated temperatures. It is a further object of the present invention to provide a method for reducing the loss of water from cement slurries without reducing the compressive strength of the cement or delaying the rate at which the cement solidifies. It is yet another object of the present invention to provide a method for reducing the loss of water from cement slurries at an elevated temperature. It is also an object of the present invention to provide cement compositions having improved water loss properties at elevated temperatures. It is yet a further object of the present invention to provide an improved method for cementing oil and gas wells.

In accordance with the present invention, it has been discovered that an additive comprising (A) a tetrapolymer, (B) an electrolyte, (C) a base, (D) at least one surfactant, and (E) water, will reduce the water loss from cement slurries without reducing the compressive strength of the cement or delaying the rate at which the cement solidifies. It has also been discovered that this additive will control the water loss from cement slurries at elevated temperatures.

As used in this application, the term tetrapolymer refers to a water soluble polymer which is composed of a) from 1 to 60 weight percent of N-vinyl-2-pyrrolidone, b) from 1 to 60 weight percent of at least one monomer selected from the group consisting of acrylamide or methacrylamide, c) from 10 to 90 weight percent of at least one monomer selected from the group consisting of 2-acrylamido-2-methylpropane sulfonic acid or sodium 2-acrylamido-2-methylpropane sulfonate, and d) from 1 to 60 weight percent of at least one monomer selected from the group consisting of acrylic acid or sodium acrylate.

The tetrapolymers of the present invention as well as their methods of preparation are known to those skilled in the art. As such their preparation can be achieved by polymerization in accordance with any of the well known free radical techniques in solution, suspension or emulsion environment. See, for example, U.S. Pat. No. 3,547,899, or European patent application No. 0115836. In addition, such other methods of polymerization as would have occurred to one skilled in the art may be employed, and the present invention is not limited to any particular method of preparing the tetrapolymers set out herein.

The molecular weight of the tetrapolymers of the present invention may be varied over a considerable range. The molecular weight may be as low as 30,000 or as high as 1,000,000 or more, provided, of course that the properties of the aqueous hydraulic cement slurry to which the tetrapolymer is added, are not adversely affected thereby.

At the present time the presently preferred tetrapolymer contains from 30 to 40 weight percent of N-vinyl-2-pyrrolidone, from 5 to 15 weight percent of acrylamide, from 50 to 60 weight percent of sodium 2-acrylamido-2-methylpropane sulfonate, and from 1 to 10 weight percent of acrylic acid.

Suitable electrolytes (B) for use in the present invention can be selected from the group consisting of sodium, potassium, lithium, or ammonium salts of chlorine, bromine, iodine, nitrate, or fluorine. At the present time, the preferred electrolyte is potassium chloride.

Suitable bases (C) for use in the present invention include those selected from the group consisting of potassium hydroxide, sodium hydroxide, or ammonium hydroxide. The presently preferred base is potassium hydroxide.

Suitable (D) surfactants for use in the present invention can be selected from the group consisting of:

1) carboxylates of the formula $$RCOO^-M^+$$

wherein R is selected from the group consisting of alkyl groups containing from 9 to 21 carbon atoms and M is selected from the group consisting of sodium, potassium, or lithium;

2) polyalkoxycarboxylates represented by the formula $$R-[OCH_2CH_2]_nCH_2\overset{O}{\underset{\|}{C}}-O^-M^+$$

wherein R is selected from the group consisting of alkyl and alkylaryl groups containing from 10 to 21 carbon atoms, M is selected from the group consisting of sodium, lithium or potassium, and n is an integer from 5 to 21;

3) sulfonates of the formula $$R\ SO_3^-M^+$$

wherein R is selected from the group consisting of alkyl groups containing from 10 to 20 carbon atoms, and M is selected from the group consisting of sodium, potassium, or lithium;

4) alkylbenzene sulfonates represented by the formula $$RC_6H_4SO_3^-M^+$$

wherein R is selected from the group consisting of alkyl groups containing from 10 to 20 carbon atoms, and M is selected from the group consisting of sodium, lithium, or potassium;

5) lignosulfonates;

6) naphthalene sulfonates of the formula $$RC_{10}H_6SO_3^-M^+$$

wherein R is selected from the group consisting of alkyl groups containing from 3 to 10 carbon atoms, and M is selected from the group consisting of sodium, lithium, calcium or potassium;

7) naphthalene sulfonates which have been condensed with formaldehyde;

8) the alpha-olefin sulfonates of the formula $$RC=CHSO_3^-M^+$$

wherein R is selected from the group consisting of alkyl groups containing from 10 to 20 carbon atoms and M is selected from the group consisting of potassium, sodium or lithium;

9) poly(ethylene glycol) monomethyl ethers of the formula $$HO-(CH_2CH_2O)_xCH_3$$

wherein x can vary from about 20 to about 225,000.

10) polyethylene glycols of the formula $$HO(CH_2CH_2O)_xH$$

wherein x can vary from about 20 to about 225,000.

11) alcohol ethoxylates of the formula $$R[OCH_2CH_2]_nOH$$

wherein R is selected from the group consisting of alkyl groups containing from 6 to 20 carbon atoms and n is an integer from 2 to 100;

12) alkylphenyl ethoxylates of the formula $$RC_6H_4(OC_2H_4)_nOH$$

wherein R is selected from the group consisting of alkyl groups containing from 8 to 15 carbon atoms and n is an integer from 2 to 70; and 13) petroleum sulfonates.

All of these surfactants as well as their methods of preparation are well known to those skilled in the art. They are available from numerous commercial suppliers.

At the present time it is preferred that the cement slurry water loss additive contain two surfactants.

One of the preferred surfactants is poly(ethylene glycol) monomethyl ether. The surfactant will have a molecular weight ranging from about 200 to about 8000, preferably 200 to 1000. Presently Dow Froth 1012 ® with molecular weight of about 385 is the most preferred.

The other preferred surfactant is a naphthalene sulfonate formaldehyde condensate. Such compounds are also known as sulfonated condensation products of formaldehyde and naphthalene or metal salts of condensation products of naphthalene sulfonic acid with formaldehyde.

Condensed naphthalene sulfonate formaldehyde condensates suitable for use in the present invention are marketed by a number of companies under various brands and the preparation of some of these are set forth, for example, in U.S. Pat. Nos. 3,537,869 or 4,814,887. Examples of commercially available naphthalene sulfonate formaldehyde condensates are Lomar D ®, CFR-2 ®, Tamol ®, SM ®, TIC ®, and Doxad ®. Currently Lomar D ® is the preferred naphthalene sulfonate formaldehyde condensate.

At the present time, it is also preferred that the water loss additive contain (F), a preservative. The nature of the preservative is not critical to the practice of the present invention and any commercially available preservative is suitable for use in the present invention. At the present time, the preferred preservative is a paraformaldehyde.

The constituents of the water loss additive are present in the following quantities:

|   |   | Broad Range wt % | Preferred Range wt % |
|---|---|---|---|
| A | Tetrapolymer | 0.1–70 | 1.5–10 |
| B | Electrolyte | 0.1–37.2 | 2–10 |
| C | Base | 0.1–3 | .2–2 |
| D | Surfactant | 0.1–40 | 5–15 |
| E | Water | 29–95 | 70–80 |
| F | Preservative (optional) | 0.001–5 | .008–.05 |

The fluid additive of the present invention is suitable for use with any hydraulic cement. The term hydraulic cement is meant to encompass any organic cement that hardens or sets under water. Hydraulic cements, for example, include portland cements, aluminus and pozzolan cements, and the like. The term hydraulic cement is also intended to include cements having minor amounts of extenders such as bentonite, gilsonite, and is also intended to include cements used either without any appreciable sand or aggregate material or such cements admixed with a granular filling material such as sand, ground limestone, and the like. Thus, for example, any of the class A-J cements listed in API Spec 10, Section 2, First Ed., January, 1982, are suitable for this purpose. Strength enhancers such as silica powder can also be employed.

The dry hydraulic cement component, the fluid loss additive of the present invention, is admixed with water to form a pumpable, settable cement slurry. The cement sets to form a monolithic solid. The water which is employed to form the cement slurry may be any naturally occurring water suitable for preparing cement slurries. Sea water may be employed and is thus convenient in offshore operations. It is a particular advantage of the fluid loss additive of the present invention that it is effective in reducing fluid loss from cement slurries even where brines are employed to make up the slurry. This constitutes another important advantage of the invention over many other cement additives known in the art.

The amount of water employed to make up the hydraulic cement slurry is not critical, and generally the amount of water necessary to give a settable cement composition having the required characteristics will be an amount from about 25 to about 150 percent by weight, based on the weight of the dry hydraulic cement. As discussed previously, the amount of water employed should be only such as is sufficient to produce a pumpable slurry. Use of the water loss additive of the present invention makes it unnecessary to add excess water in anticipation of substantial water losses.

Generally, the amount of fluid loss additive employed will be in the range of from 0.2 gal to 2.5 gal of additive per 94 lbs. of cement utilized in preparing the cement slurry.

The fluid loss additive of the present invention is suitable for use in cement slurries that are subjected to temperatures ranging from 80° F. to 450° F.

In the method of cementing a well bore with the present additive, a hydraulic cement, water and the fluid loss additive of the present invention are mixed together to form a pumpable slurry. The cement slurry so prepared is then pumped to the desired location in the well bore and allowed to harden to form a solid mass.

The following examples are intended to illustrate the advantages of this invention, but are not intended to unduly limit this invention.

EXAMPLE I

The purpose of this example is to demonstrate the composition of and a method for preparing the preferred fluid loss additive of the present invention.

The composition of the preferred fluid loss additive system of the present invention is represented below.

TABLE I

| Material | Amount (wt in grams) |
| --- | --- |
| Water | 78 |
| KCl | 2 |
| KOH | 1 |
| Paraformaldehyde | 0.02 |
| Sodium naphthalene formaldehyde condensate[1] | 9.8 |

TABLE I-continued

| Material | Amount (wt in grams) |
| --- | --- |
| Poly(ethylene glycol)monomethyl ether[2] | 4 |
| Tetrapolymer[3] | 5 |

[1] Lomar D ®, Diamond Shamrock
[2] Dow Froth 1012 ®, Dow
[3] a poly(sodium 2-acrylamido-2-methylpropane sulfonate-co-N-vinyl-2-pyrrolidone-co-acrylamide-co-acrylic acid), containing 55 wt % sodium 2-acrylamido-2-methylpropane sulfonate, 35 wt % N-vinyl-2-pyrrolidone, 10 wt % acrylamide, 5 wt % acrylic acid and is commercially available as HE ® polymer from Phillips Petroleum Company.

A preferred manner of preparing this fluid loss additive is to mix the ingredients in the order listed under agitation.

EXAMPLE II

A series of cementing slurry compositions in accordance with the present invention and having the compositions as noted in Table II below were prepared by mixing the additive system of Example I with water and a Class H cement[1].

[1] A Class H cement as defined in API Spec 10, Section 2.2, First Ed., January 1982. The cement used is commercially available from General Portland under the brand name TRINITY LAFARGE H ®.

TABLE II

| Material | Amount | Amount water loss in gal/sack of cement |
| --- | --- | --- |
| Cement A | | |
| Class H cement | 829.85 gm | 0.3 gal |
| Water | 313.5 ml | |
| Water loss additive | 22.2 ml | |
| Cement B | | |
| Class H cement | 829.85 gm | 0.41 gal |
| Water | 305.5 ml | |
| Water loss additive | 30.3 ml | |
| Cement C | | |
| Class H cement | 829.85 gm | 0.60 gal |
| Water | 285.5 ml | |
| Water loss additive | 50.2 ml | |
| Cement D | | |
| Class H cement | 829.85 gm | 0.68 gal |
| Water | 285.5 ml | |
| Water loss additive | 50.1 ml | |
| Cement E | | |
| Class H cement | 829.85 gm | 0.75 gal |
| Water | 280.42 ml | |
| Water loss additive | 55.2 ml | |
| Cement F (control) | | |
| Class H cement | 829.85 gm | 0 |
| Water | 335.7 ml | |
| Cement G (control) | | |
| Class H cement | 850.96 gm | 0 |
| Water | 328.9 ml | |
| Cement H | | |
| Class H cement | 645.92 gm | 0.41 gal |
| Sand | 226.1 gm | |
| Water | 284.35 ml | |
| Water loss additive | 23.51 ml | |
| Cement I | | |
| Class H cement | 645.92 gm | 0.60 gal |
| Sand | 226.1 gm | |
| Water | 273.46 ml | |
| Water loss additive | 34.4 ml | |
| Cement J | | |
| Class H cement | 645.92 gm | 0.75 gal |
| Sand | 226.1 gm | |
| Water | 264.86 ml | |
| Water loss additive | 43.0 ml | |
| Cement K | | |
| Class H cement | 829.05 gm | .80 gal |
| Water | 275.8 ml | |
| Water loss additive | 58.9 ml | |
| Cement L | | |
| Class H cement | 829.85 gm | 1.00 gal |

TABLE II-continued

| Material | Amount | Amount water loss in gal/sack of cement |
|---|---|---|
| Water | 261.1 ml | |
| Water loss additive | 73.7 ml | |

EXAMPLE III

To demonstrate that the water loss additive of the present invention will reduce the water loss from cement slurries over a broad range of temperatures; the water loss properties of cementing slurry compositions prepared as in Example II were determined in accordance with API Spec 10, Appendix F, First Ed., January 1982.

The following results were obtained.

TABLE III

| Cement | Concentration of Additive (gal/94 lbs cement) | Temp. °F. | Fluid-Loss cc/30' |
|---|---|---|---|
| B | 0.41 | 80 | 66 |
| B | 0.41 | 100 | 76 |
| D | 0.68 | 100 | 40 |
| F (Control) | 0.00 | 100 | +1298 |
| B | 0.41 | 125 | 74 |
| D | 0.68 | 125 | 46 |
| F (Control) | 0.00 | 125 | +1298 |
| B | 0.41 | 170 | 80 |
| D | 0.68 | 170 | 46 |
| F (Control) | 0.00 | 170 | +1500 |
| H | 0.41 | 170 | 78 |
| I | 0.60 | 170 | 48 |
| H | 0.41 | 200 | 118 |
| I | 0.60 | 200 | 131 |
| I | 0.60 | 230 | 138 |
| I | 0.60 | 250 | 40 |
| J | 0.75 | 300 | 54 |

The water loss properties of cement slurries prepared without the additive of the present invention (cement F) were determined at temperatures ranging from 100° F. to 170° F. These cement slurries lost between 1298 to 1500 cc of fluid during the 30 minute testing period.

The water loss properties of cement slurries prepared with the additive of the present invention were determined at temperatures ranging from 80° F. to 300° F. These cements only lost from 40 to 138 cc of fluid during the 30 minute testing period.

Thus, this data demonstrates that the additive of the present invention provides cements with superior water loss properties over a broad temperature range.

EXAMPLE IV

To demonstrate that the fluid loss additive of the present invention does not decrease the compressive strength of the resulting cement composition, a series of cement compositions as prepared in Example II were tested in accordance with API Spec 10, Section 7, Compressive Strength Tests, First Ed., January 1982.

The following data was generated.

TABLE IV

| | | 24 Hr COMPRESSIVE STRENGTH (PSI) | | | |
|---|---|---|---|---|---|
| | Concentration of Additive (gal/ | @ Atmospheric pressure | | @ 3000 PSI | |
| Cement | 94 lbs of cement | 80° F. | 125° F. | 150° F. | 170° F. |
| F (Control) | 0.00 | 1483 | 3517 | 4646 | 4799 |
| A | 0.30 | 1483 | 3725 | 4697 | 4713 |
| B | 0.41 | 1508 | 3642 | 4689 | 5013 |
| C | 0.68 | 1550 | 3775 | 5847 | 6192 |

Cement F was prepared without the fluid loss additive of the present invention. It demonstrated a compressive strength of 1483 PSI at 80° F. during a 24 hour compressive strength test.

Cements A, B, and C were prepared with the fluid loss additive of the present invention. They demonstrated compressive strengths ranging between 1483 to 1550 PSI. Thus, the additive of the present invention does not decrease the compressive strength of cements.

A similar trend was demonstrated in the tests conducted at 125° F., 150° F., and 170° F.

EXAMPLE V

To demonstrate that the additive of the present invention will reduce the fluid loss from cement slurries which have been formulated with salt water, a cement slurry B', D', L' and M' were prepared as were Cements B, D, L, and M of Example II except that varying concentrations of salt water was used to prepare the cementing slurry. For comparative purposes a cement slurry F was prepared as in Example II.

The fluid loss properties of these cement slurries were determined in accordance with API Spec 10, Appendix F, First Ed., January, 1982.

The following results were obtained.

TABLE V

| Cement | Concentration of Additive (gal/94 lbs cement) | NaCL wt % | Temp. °F. | Fluid-Loss cc/30' |
|---|---|---|---|---|
| F (Control) | 0 | 0.0 | 100 | +1298 |
| B' | 0.41 | 3.0 | 80 | 123 |
| B' | 0.41 | 10.0 | 80 | 134 |
| B' | 0.41 | 18.0 | 80 | 180 |
| B' | 0.41 | 37.2 | 80 | 68 |
| D' | 0.68 | 3 | 100 | 50 |
| D' | 0.68 | 3 | 125 | 48 |
| D' | 0.68 | 3 | 150 | 50 |
| D' | 0.68 | 3 | 175 | 53 |
| D' | 0.68 | 10 | 100 | 49 |
| D' | 0.68 | 10 | 125 | 46 |
| D' | 0.68 | 10 | 150 | 63 |
| D' | 0.68 | 10 | 175 | 66 |
| L' | 0.80 | 3 | 100 | 43 |
| L' | 0.80 | 3 | 125 | 45 |
| L' | 0.80 | 3 | 150 | 48 |
| L' | 0.80 | 3 | 175 | 42 |
| L' | 0.80 | 10 | 100 | 49 |
| L' | 0.80 | 10 | 125 | 52 |
| L' | 0.80 | 10 | 150 | 54 |
| L' | 0.80 | 10 | 175 | 56 |
| M' | 1.00 | 18 | 200 | 94 |
| M' | 1.00 | 37.2 | 100 | 104 |
| M' | 1.00 | 37.2 | 125 | 110 |
| M' | 1.00 | 37.2 | 150 | 122 |
| M' | 1.00 | 37.2 | 175 | 130 |
| M' | 1.00 | 37.2 | 200 | 146 |

Cement F which was prepared without the additive of the present invention, exhibited a fluid loss in excess of 1298 cc during the 30 minute testing period. The cement slurries prepared with the fluid loss additive of the present invention only lost from 43 to 180 cc's during the 30 minute test period. Thus, the fluid loss additive of the present invention will reduce the water loss from cement slurries which have been formulated with salt water.

EXAMPLE VI

To demonstrate that the fluid loss additive of the present invention does not retard the rate at which the cement solidifies, cementing compositions were prepared as in Example II and the rate at which the cement thickens was determined in accordance with API, Spec 10, Section 8, First Ed., January, 1982.

The following results were obtained.

TABLE VI

| Cement | Concentration of Additive (gal/ 94 lbs. of cement) | Temp. (°F.) | API Schedule | Thickening Time[1] (in hours) 70 Bc | 100 Bc |
|---|---|---|---|---|---|
| F | 0.00 | 80 | 1g3 | 4:45 | 4:57 |
| B | 0.41 | 80 | 1g3 | 4:11 | 4:25 |
| C | 0.68 | 80 | 1g3 | 5:08 | 5:19 |
| F | 0.00 | 100 | 3g4 | 2:49 | 3:14 |
| B | 0.41 | 100 | 3g4 | 2:54 | 3:28 |
| C | 0.68 | 100 | 3g4 | 3:02 | 3:30 |
| F | 0.00 | 125 | 5g3 | 1:36 | 1:46 |
| B | 0.41 | 125 | 5g3 | 1:43 | 1:47 |
| C | 0.68 | 125 | 5g3 | 1:52 | 2:00 |

[1] Variations of 30 minutes or less in thickening time is considered within normal experimental error.

Cement F which does not contain the fluid loss additive of the present invention, thickened in 4 hours and 45 minutes when tested at 80° F.

Cements B and C which contained the additive of the present invention, thickened in 4 hours, 11 minutes; and 5 hours, 8 minutes; respectively.

Although at first glance it appears that the additive of the present invention retarded the rate at which Cement C solidified, this is not the case.

Due to the large amount of experimental error inherent in the testing procedures, cements which thicken within 30 minutes of each other are considered to have equivalent thickening rates. Therefore, the additive of the present invention does not delay the rate at which cement slurries solidify.

Reasonable variations can be made in view of the foregoing disclosure without departing from the spirit or scope of the present invention.

That which is claimed is:

1. A fluid loss additive comprising:
   a) a tetrapolymer present in the quantity of from 1.5 to 10 weight percent and prepared by polymerizing from 30 to 40 weight percent of N-vinyl-2-pyrrolidone, from 50 to 60 weight percent of sodium 2-acrylamide-2-methylpropane sulfonate, from 1 to 10 weight percent of acrylic acid, and from 5 to 15 weight percent of acrylamide;
   b) an electrolyte selected from the group consisting of NaCl, KCl, $NH_3Cl$, $NaNO_3$, $KNO_3$ and $NH_3NO_3$ present in the quantity of from 2 to 10 weight percent;
   c) a base selected from the group consisting of KOH, NaOH and $NH_4OH$ present in the quantity of from 0.2 to 2.0 weight percent;
   d) a surfactant selected from the group consisting of
      i) lignosulfonates;
      ii) naphthalene sulfonates of the formula $RC_{10}H_6SO_3M$ wherein R is selected from the group consisting of alkyl groups containing from 3 to 10 carbon atoms, and M is selected from the group consisting of sodium, lithium or potassium;
      iii) naphthalene sulfonates which have condensed with formaldehyde;
      iv) poly(ethylene glycol) monomethyl ethers of the formula $HO(CH_2CH_2-O)_xCH_3$ wherein x can vary from about 20 to about 225,000;
      v) polyethylene glycols of the formula $HO(CH_2CH_2-O)_xH$ wherein x can vary from about 20 to 225,000; and
      vi) alcohol ethoxylates of the formula $R[OCH_2CH_2]_nOH$ wherein R is selected from the group consisting of alkyl groups containing from 6 to 20 carbon atoms and n is an integer from 2 to 100;
   wherein said surfactant is present in the quantity of from 5 to 15 weight percent; and
   e) water is present in the quantity of from 70 to 80 weight percent.

2. The fluid loss additive of claim 1 wherein a preservative is present in the quantity of from 0.008 to 0.05 weight percent.

3. The fluid loss additive of claim 2 wherein
   a) said electrolyte is KCl;
   b) said base is KOH;
   c) said surfactants are sodium naphthalene formaldehyde condensate and poly(ethylene glycol) monomethyl ethers; and
   d) said preservative is paraformaldehyde.

* * * * *